United States Patent [19]
Campbell et al.

[11] Patent Number: 5,289,692
[45] Date of Patent: Mar. 1, 1994

[54] APPARATUS AND METHOD FOR MASS FLOW CONTROL OF A WORKING FLUID

[75] Inventors: Chester D. Campbell, Rancho Santa Margarita; Sandra L. Harper, Dana Point; Jain Virender, Lake Forest; Richard L. Kenyon, Irvine, all of Calif.; Alan Matthies, Milwaukee, Wis.; Roy M. Yabuki, Los Angeles, Calif.

[73] Assignee: Parker-Hannifin Corporation, Cleveland, Ohio

[21] Appl. No.: 5,606

[22] Filed: Jan. 19, 1993

[51] Int. Cl.⁵ .................. F25B 39/04; F25B 41/04
[52] U.S. Cl. .................................. 62/181; 62/184; 62/204; 62/210; 62/225; 62/228.3; 62/DIG. 17
[58] Field of Search ............... 62/180, 181, 183, 184, 62/203, 204, 208, 209, 210, 212, 216, 222, 224, 225, 226, 228.3, DIG. 17

[56] References Cited

U.S. PATENT DOCUMENTS

| | | | |
|---|---|---|---|
| 3,478,534 | 11/1969 | Matthies | 62/225 |
| 3,744,267 | 7/1973 | Norbeck | 62/193 |
| 4,167,858 | 9/1979 | Kojima et al. | 62/126 |
| 4,646,535 | 3/1987 | Matsuoka et al. | 62/228.5 |
| 4,790,145 | 12/1988 | Thompson et al. | 62/225 X |
| 4,794,762 | 1/1989 | Orth et al. | 62/184 X |
| 4,807,445 | 2/1989 | Matsuoka et al. | 62/325 X |
| 4,835,976 | 6/1989 | Torrence | 62/115 |
| 4,841,734 | 6/1989 | Torrence | 62/115 |
| 4,848,100 | 7/1989 | Barthel et al. | 62/184 X |
| 4,944,160 | 7/1990 | Malone et al. | 62/180 |
| 4,993,231 | 2/1991 | Torrence et al. | 62/115 |
| 5,035,119 | 7/1991 | Alsenz | 62/225 |
| 5,086,624 | 2/1992 | Matsuoka et al. | 62/184 X |
| 5,144,814 | 9/1992 | Gaudette | 62/225 |

OTHER PUBLICATIONS

Hand Book of Thermistor Applications, Victory Engineering Corp., 1968, pp. 1–27.

Determination of Boiling Point and Boiling Range of Refrigerants, Refrigerating Engineering, Mar. 1956, pp. 36–40, 100, 102.

Measuremnt of Vapor Pressures by Means of Matches Thermistors, A. P. Brady, Harriette Huff, Jan. 1960, pp. 304–311.

*Primary Examiner*—Harry B. Tanner
*Attorney, Agent, or Firm*—Rankin, Hudak & Hill

[57] ABSTRACT

A mass flow control apparatus and method for use in combination with a heat transfer system having a compressor, condenser, expansion valve, evaporator and working fluid in a s fluid circuit. The mass flow is controlled using a quality sensor for the working fluid exiting the evaporator, and a high side pressure sensor. A control circuit is provided that monitors the quality sensor and the high side pressure sensor, and controls operation of the compressor, condenser fan and valve in response thereto. A flow reduction mode is used to reduce high side pressure at the valve inlet without excessive compressor cycling by changing the quality sensor setpoint when the high side pressure exceeds the condenser fan turn-on pressure but is less than the compressor disengage pressure.

14 Claims, 3 Drawing Sheets

APPARATUS AND METHOD FOR MASS FLOW CONTROL OF A WORKING FLUID

BACKGROUND OF THE INVENTION

The invention relates generally to heat transfer and refrigeration control systems. More particularly, the invention relates to control devices particularly suited for detecting and controlling characteristics and mass flow of the working fluid in such systems.

The basic building blocks of all refrigeration and heat transfer systems are well known and include a compressor, a condenser, an expansion means and an evaporator, all of which are connected in a fluid circuit having a working fluid such as halogen containing refrigerants such as chlorofluorocarbons (CFCs), hydrochlorofluorocarbons (HCFCs), and hydrofluorocarbons (HFCs), and so forth. In an automotive or truck air conditioning system, for example, the working fluid or refrigerant is typically in heat exchange with the vehicle compartment air by means of the evaporator. The liquid refrigerant turns to gas as it passes through the evaporator or endothermic heat exchanger thus absorbing heat from the ambient air. The gaseous refrigerant leaving the evaporator is drawn into the compressor through a suction line. The compressor increases the gas pressure and the gas then passes through the condenser or exothermic heat exchanger where it is cooled back to a liquid state but is still under high pressure. The pressurized liquid refrigerant is then passed through the expansion valve wherein the fluid pressure is adiabatically decreased prior to reentering the evaporator.

Over the years, many different types of control mechanisms and monitoring devices have been used to regulate the operation of heat transfer or refrigeration systems. One of the more important functions required of a heat transfer control system is to monitor and control the low pressure vapor quality in the suction line near the outlet of the evaporator or at the inlet to the compressor. This is important for many reasons, particularly to maximize cooling from the refrigerant flow, and to protect the compressor from receiving liquid refrigerant and/or a loss of lubricant.

A common technique in use today is to maintain a minimum superheat in the vaporous refrigerant exiting the evaporator. The superheat is usually maintained in the range of 5 to 10 degrees fahrenheit. In some systems the superheat is regulated by monitoring the evaporator inlet and outlet temperatures of the refrigerant and controlling the flow with the expansion valve so that the temperature difference is near a preset value or range. Other approaches include the use of pressure and temperature sensors on the outlet side of the evaporator to measure the actual saturation temperature and pressure characteristics of the refrigerant based on the thermodynamic properties of the refrigerant. Still another approach is the use of charged bulb sensors. From a heat transfer efficiency standpoint, it is desirable, of course, to maintain a low superheat which is difficult with the aforementioned sensors and controls.

Although these known approaches for regulating superheat can work, they tend to exhibit inaccurate control. One reason is that in the evaporator the liquid and gas phases are not in thermal equilibrium. The droplets of gas are boiling because heat is being transferred to the droplets from the gas phase. In order for this to take place, the gas must be hotter than the liquid, which makes conventional superheat measurement difficult.

Another significant problem with low superheat control systems is that mass flow of the refrigerant through the evaporator can change over a large range without an appreciable change in the conventionally measured superheat. Thus, superheat is a poor control mechanism for regulating the quality of the refrigerant at the outlet of the evaporator.

In addition to evaporator outlet quality, being able to determine the pressure conditions on the high pressure side of the expansion valve is also useful in maintaining efficient operation of the heat transfer system. In the past, pressure detection on the system high pressure side between the compressor and the expansion valve has been accomplished by such means as mechanical or electromechanical pressure transducers, pressure responsive valves or simpler temperature sensors, the latter being used to approximate pressure based on the ambient temperature of the refrigerant. The mechanically responsive pressure sensors and valves tend to exhibit slow response times to working fluid conditions, low reliability and limited control capabilities. More recently, the ready availability of electronic controllers such as microprocessors and other digital/analog controllers has provided the opportunity to electronically control and monitor the operation of the heat transfer system. This has an important benefit of being able to greatly reduce the cost, size and weight of the control system, as well as improving the reliability and flexibility of the control functions.

Although the use of electronic controllers is well known, a suitable electronic pressure sensor has not yet been realized that is low cost but reliable and simple to incorporate into both new refrigeration systems as well as for retrofitting or upgrading older systems. Past efforts, for example, have attempted to use self-heated thermistors to boil the refrigerant and thus determine the pressure based on the boiling point. This approach is inherently flawed, however, because a thermistor senses its own temperature, not the temperature of the refrigerant. By allowing the thermistor to self-heat by forcing constant current therethrough, the temperature measurement becomes inaccurate and unreliable. The refrigerant boiling point technique is further flawed by the fact that the controller can only be operated on the assumption that the thermistor is actually sensing the saturation temperature (i.e. the boiling point). The thermistor cannot detect the boiling event per se.

Accordingly, the need exists for an economical, reliable and accurate apparatus and method for detecting characteristics of a working fluid in a heat transfer system, particularly as those characteristics relate to controlling the quality of the refrigerant between the outlet of the evaporator and the compressor inlet, as well as determining and controlling pressure in the high pressure regions of the fluid circuit.

SUMMARY OF THE INVENTION

The present invention contemplates apparatus and methods for detecting and controlling characteristics of a working fluid for a heat transfer system. In a preferred embodiment of the invention such apparatus includes in combination with a fluid circuit comprising a compressor for increasing pressure of a working fluid received from an evaporator, a condenser and condenser fan for cooling working fluid received from the compressor, and an electrically controlled expansion valve for controlling flow of the working fluid between the condenser and the evaporator: a quality sensor operative in response to a control signal and disposed in the fluid circuit on the outlet side of the evaporator, a high pressure sensor disposed in the fluid circuit on the high pressure side of the expansion valve, and control means for providing the control signal to the quality sensor; the quality sensor detecting quality of the working fluid in the heat transfer system; the control means producing output signals for activating and deactivating the compressor and condenser fan and regulating flow of the working fluid through the expansion valve in response to the high pressure sensor output and the quality sensor output as a function of control setpoints; the control means operating the valve in a flow reduction mode to reduce high side pressure before deactivating the compressor.

The invention further contemplates the methods associated with the use of such apparatus as well as a preferred method for controlling operation of a compressor and expansion valve in a heat transfer system including the steps of detecting high side pressure of the working fluid; detecting quality of the working fluid between the evaporator outlet and the compressor inlet; controlling operation of the expansion valve as a function of the detected working fluid quality based on a predetermined setpoint; and adjusting the quality setpoints as a function of the high side pressure.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 3 is a simplified view in partial section of a preferred mounting arrangement for a quality sensor in accordance with the invention.

DETAILED DESCRIPTION OF THE INVENTION AND PREFERRED EMBODIMENT

Figure 1:
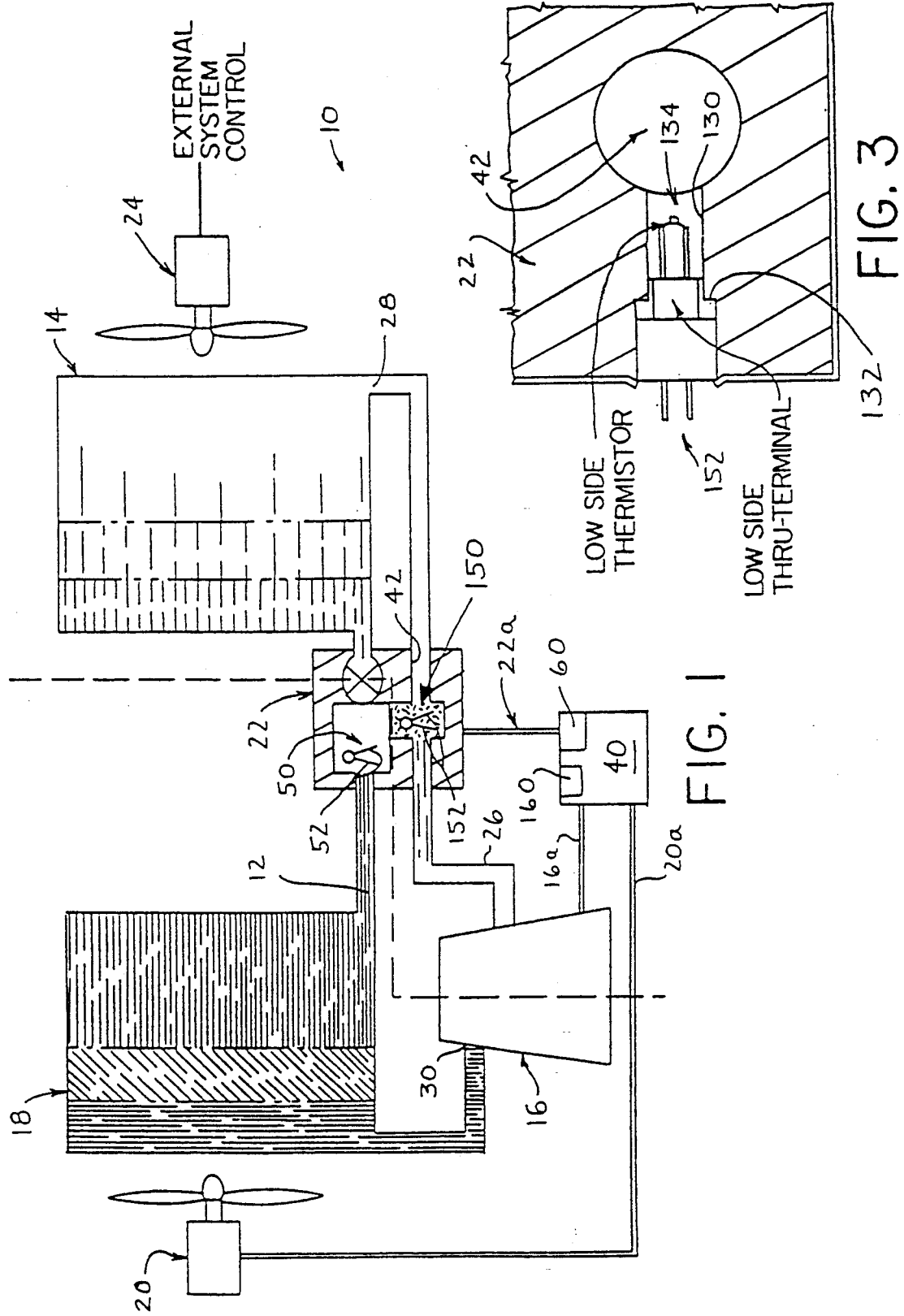
FIG. 1 is a simplified schematic diagram of a heat transfer system suitable for use with the present invention including sensors according to the invention incorporated therein.

With reference to FIG. 1, we illustrate a heat transfer system generally designated by the numeral 10. For convenience, the invention is described herein in connection with a vehicle air conditioning system such as may be used for cars and trucks. However, this exemplary description is only for convenience and clarity and should not be construed in a limiting sense. For this reason, the heat transfer system components are described in basically generic terms without specific detail because they form no particular part of the invention except as specifically noted herein. The invention is suitable for use with any type of heat transfer system including, but not limited to, commercial refrigeration, heat pump systems, residential air conditioning, industrial air conditioning and so forth. The invention is particularly useful for vehicle air conditioning because of its small size, low power consumption and fast response to system conditions. Furthermore, the invention is not limited to use with specific working fluids, but can be used to determine characteristics of any fluid compatible with the temperature dependent resistance devices. Of particular interest for future refrigeration management systems is that the invention is particularly suited for use with R-134 refrigerant.

As used herein, the terms "working fluid" and "refrigerant" are used interchangeably and in their broadest sense to include any fluid used to effect exothermic and endothermic heat transfer. Furthermore, the terms "heat transfer" and "refrigeration" are not intended to be limiting in any sense, so that it will be understood that the invention can be used with cooling systems, heating systems and systems that interchangeably heat and cool.

In general then, the heat transfer system 10 includes a working fluid 12 such as R-12 or R-134 in an interconnected fluid circuit that includes an evaporator 14, a compressor or pump 16, a condenser 18 including a condenser fan 20 and an expansion device 22. The evaporator typically is positioned proximate a fan 24 that blows conditioned air, such as passenger compartment air, over cooling fins on the evaporator so that the refrigerant can absorb heat from the ambient air. In FIG. 1 the working fluid is shaded in different ways to illustrate in an exemplary manner the different phases and pressure conditions typical in a heat transfer system 10. The compressor 16 draws gaseous refrigerant through a suction line 26 from the evaporator outlet 28. The compressor raises the operating pressure of the gaseous refrigerant, typically to a pressure of several hundred PSIA. From the compressor outlet 30 the refrigerant flows to the condenser 18 wherein it is cooled to a liquid state. Cooling of the fluid can be regulated by operation of the condenser fan 20. The expansion device 22 is preferably a valve that is used to regulate the flow of high pressure liquid refrigerant to the evaporator inlet while dropping the pressure of the liquid refrigerant to the operating pressure of the evaporator 14. As the liquid refrigerant passes through the evaporator 14 it absorbs heat from the ambient air and vaporizes or boils off. In a typical heat transfer system, it is desirable that only vaporous refrigerant flow into the compressor from the evaporator. Thus, the refrigerant will typically be in or nearly in a completely vapor state by the time it exits the evaporator.

An electronic controller 40 may be used to control operation of the condenser fan 20 using signal lines 20a, to activate and deactivate the compressor motor or clutch (not shown) using signal lines 16a, and to control operation of the expansion valve 22 using signal lines 22a. Typically, the controller increases flow of refrigerant through the valve as the thermal load increases, and decreases the flow when the thermal load decreases. Also, as the pressure increases on the inlet side of the valve 22 the controller may either turn the compressor clutch off, or actuate the condenser fan on.

These and other various control functions can be programmed into the controller in a known manner to maintain the operating parameters of the Working fluid within predetermined limits. A particularly important parameter to monitor is the working fluid pressure on the high pressure side of the system 10, such as between the condenser outlet and the valve 22 inlet. The present invention uses a preferred high pressure sensor and method embodied in the form of a self-heated thermistor that exhibits a thermal resistance transition correlated to pressure characteristics of the working fluid. Such a sensor and method is fully described in copending application Ser. No. 08/006,235 filed on Jan. 19, 1993 entitled "APPARATUS AND METHOD FOR DETECTING CHARACTERISTICS OF A WORKING FLUID" and commonly owned by the assignee of the present invention, the entire disclosure of which is fully incorporated herein by reference. Other pressure sensors, however, can be used with the present invention.

As described in the referenced copending application, and in a preferred embodiment thereof, a high side working fluid sensor for a heat transfer system includes a temperature dependent electrical resistance element 50 that preferably is disposed in direct thermal contact with the working fluid. In this configuration, the resistance element 50 is used to locally heat the working fluid. For the exemplary system described herein, the resistance element 50 is positioned in the fluid circuit near the high pressure inlet port of the expansion valve 22. However, this particular location is exemplary only, and those skilled in the art will readily appreciate that the resistance element 50 can be positioned at locations in the fluid circuit where it is desired to detect characteristics of the working fluid.

The resistance element 50 is preferably realized in the form of a thermistor, such as part no. E15SA1B053 available from Victory Engineering. A thermistor is used because it can easily be monitored by the electronic controller 40, and also because it can be used conveniently to heat locally the working fluid by passing current therethrough and as a fluid temperature sensor. However, the invention is not limited to the use of a thermistor as the resistance element 50, and other devices such as resistance temperature devices (RTDs), or a temperature sensor in combination with a separate heating element, could be used, just to name a few.

The thermistor 50, of course, includes two electrical leads 52 that are connected to a control circuit 60 that preferably is included as part of the system controller 40. A preferred control circuit 60 for the high side pressure sensor is fully described in the referenced copending application. The thermistor leads 52 can be connected to the control circuit 60 via the multiwire cable 22a which, as described above, also includes electrical leads for connecting the expansion valve to the system controller 40.

The expansion valve is preferably realized in the form of a linear proportional solenoid actuated valve, controlled electrically by a solenoid current supplied by the system controller 40. Such a valve is fully described in copending applications Ser. No. 951,259 filed on Sep. 25, 1992 entitled "Low Friction Solenoid Actuator and Valve", Ser. No. 961,563 filed on Oct. 15, 1992 entitled "Expansion Valve For Air Conditioning System With Proportional Solenoid", Ser. No. 961,567 filed on Oct. 15, 1992 entitled "Expansion Valve Control Element for Air Conditioning System" all of which are commonly owned by the assignee of the present inventions, the entire disclosure of which is fully incorporated herein by reference.

In accordance with the present invention, a low side quality sensor is provided that functions as a refrigerant temperature sensor and as a quality sensor for the vaporous refrigerant exiting the evaporator 14. In a preferred embodiment, the quality sensor includes a temperature dependent resistance element 150 that preferably is disposed in direct thermal contact with the working fluid. For the exemplary system described herein, the resistance 150 is positioned in the fluid circuit in a through port 42 formed in the valve 22 body. However, this particular location in the fluid circuit is exemplary only, and those skilled in the art will readily appreciate that the resistance 150 can be positioned at any location where working fluid quality is an important parameter. Typically this will be in the suction line 26 at or between the evaporator outlet and the compressor inlet.

The resistance element 150 is preferably realized in the form of a thermistor, such as part no. E15SA1B053 available from Victory Engineering. A thermistor is preferably used because it is low in cost, can be monitored easily by the electronic controller 40, and also because it can conveniently be used in a self-heated and nonself-heated mode by controlling the current therethrough.

The thermistor 150 includes electrical leads 152 that are connected to a control circuit 160 that preferably is included as part of the system controller 40. The thermistor leads 152 can be connected to the control circuit 160 via the multiwire cable 22a. However, the control circuit for operating the quality sensor does not have to be part of the overall system controller but can be separately provided as a stand alone circuit or separate circuit module connected to the system controller.

Figure 2:
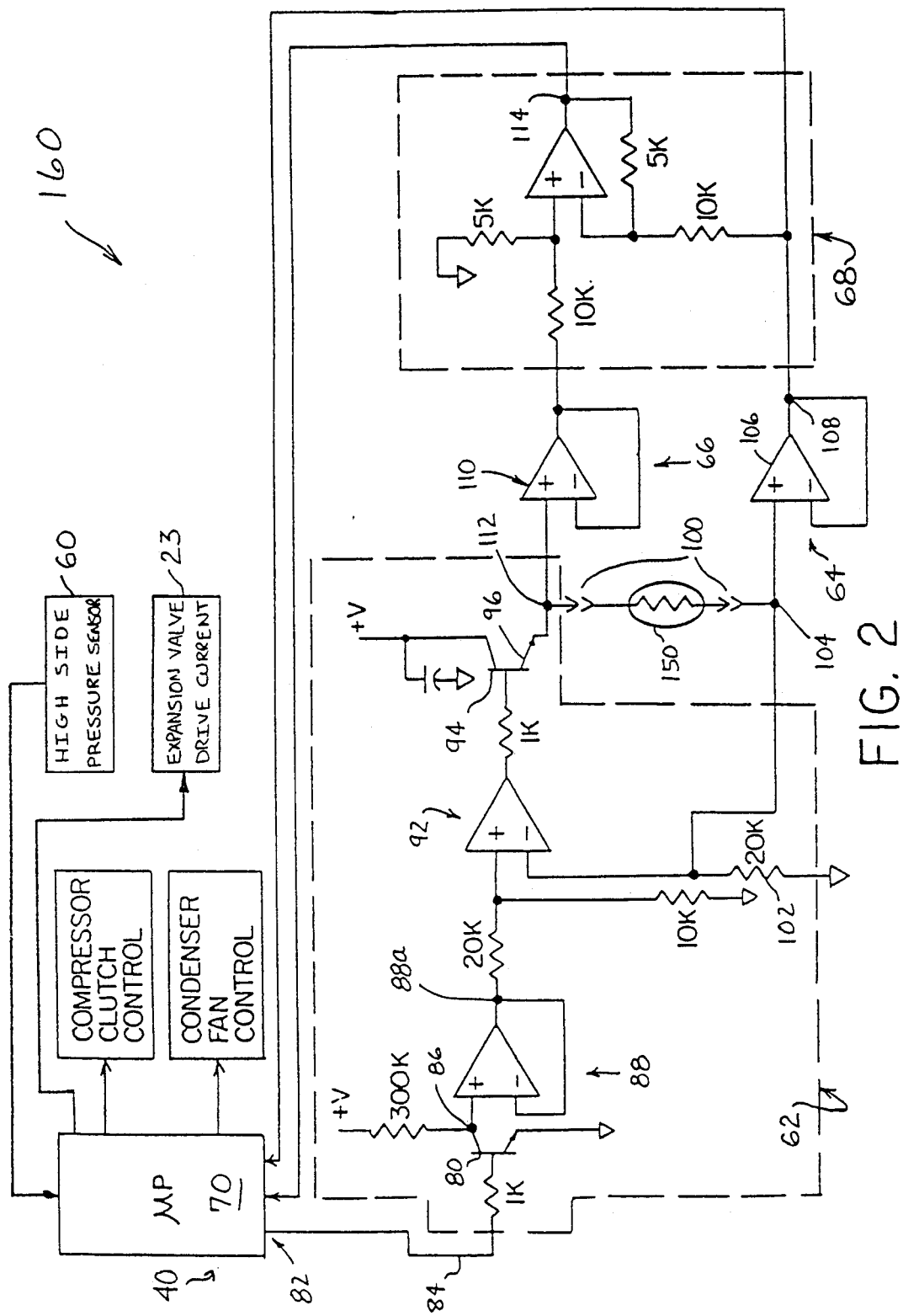
FIG. 2 is a circuit schematic of a preferred control circuit for use with the invention.

With reference now to FIG. 2, we illustrate therein a preferred control circuit 160 used in combination with the thermistor 150 to realize a quality sensor in accordance with the teachings of the present invention. The control circuit 160 is preferably a subcircuit of the overall heat transfer system controller 40, and includes a switchable current source 62, a current level detector 64, a voltage level detector 66, a differencing or subtraction circuit 68, and a control device 70. While the control device 70 is preferably realized in the form of a microprocessor that also serves as the overall system controller, this is simply for convenience. The control circuit used to realize the present invention can be practiced as a discrete control circuit, with or without the use of a microprocessor, as will be readily apparent to those skilled in the art.

The current source 62 has several functions. During a first predetermined time period the current source supplies a low level current to the thermistor 150. During this low current period, the thermistor 150 is used to detect the temperature of the working fluid in the suction line. During a second predetermined time period, the current source provides a predetermined fixed current to the thermistor 150 sufficient to cause the thermistor to self-heat and thus locally heat the working fluid.

The current source 62 includes a switching transistor 80 that has its base terminal connected to an output 82 of the microprocessor 70. At programmed time intervals, the microprocessor 70 applies a control signal to the switching transistor 80 via signal line 84. In the preferred embodiment, this control signal is a binary signal that causes the transistor 80 to turn on when the control signal is logic high, and to turn the transistor 80 off when the control signal is logic low.

The switching transistor 80 is connected to an amplifier 88 preferably configured as a voltage follower that produces an output voltage related to the voltage at the collector node 86. The amplifier 88 output 88a drives a current source transistor 94 operating in the active region by means of a control amplifier 92. When the output voltage from the amplifier 92 is high, a predetermined current sufficient to self-heat the thermistor 150 is sourced through the transistor 94 emitter output. The current source transistor emitter 96 is connected in series with the thermistor 150. This can be conveniently accomplished through a connector 100 and the multi-wire cable 22a described hereinbefore. The return conductor for the thermistor 150 is connected in series with a current sensing resistor 102 which in turn is connected between ground and the amplifier 92 as one of the differential inputs. The junction node 104 that connects the thermistor 150 to the current sensing resistor 102 is further connected to an input of the current detector 64. The current detector 64 is an amplifier 106 preferably configured as a voltage follower. Thus, the output 108 of the current detector 64 is a voltage that corresponds to the voltage drop across the current sensing resistor 102 caused by current through the thermistor 150. The output 108 of the current detector amplifier 106 is used as an input to the subtraction circuit 68. The other input to the subtraction circuit 68 is provided by the voltage detector 66. The voltage detector 66 is an amplifier 110 preferably configured as a voltage follower. The junction node 112 that connects the current source emitter 96 to the thermistor 150 is also connected tot he voltage detector amplifier 110 input. Thus, the voltage detector 66 produces an output voltage that corresponds to the voltage at the junction node 112.

The subtraction circuit 68 is realized in a conventional manner well known to those skilled in the art. The subtractor circuit 68 functions to produce an output at node 114 that represents the difference between the output voltage from the current detector 64 and the output voltage from the voltage detector 66. However, the difference of these two voltages simply represents the voltage drop across the thermistor 150. Thus, the subtractor output 114 corresponds to the voltage drop across the thermistor 150. Also, the output signal 108 from the current detector 64 corresponds to the current through the thermistor 150. As shown in FIG. 2, both of these output signals (the subtractor 68 output and the current detector 64 output) are connected as inputs to the microprocessor 70 on signal lines 116 and 118 respectively. The microprocessor can use these signals to easily calculate the resistance of the thermistor 150 because the voltage and current parameters are known.

Figure 4:
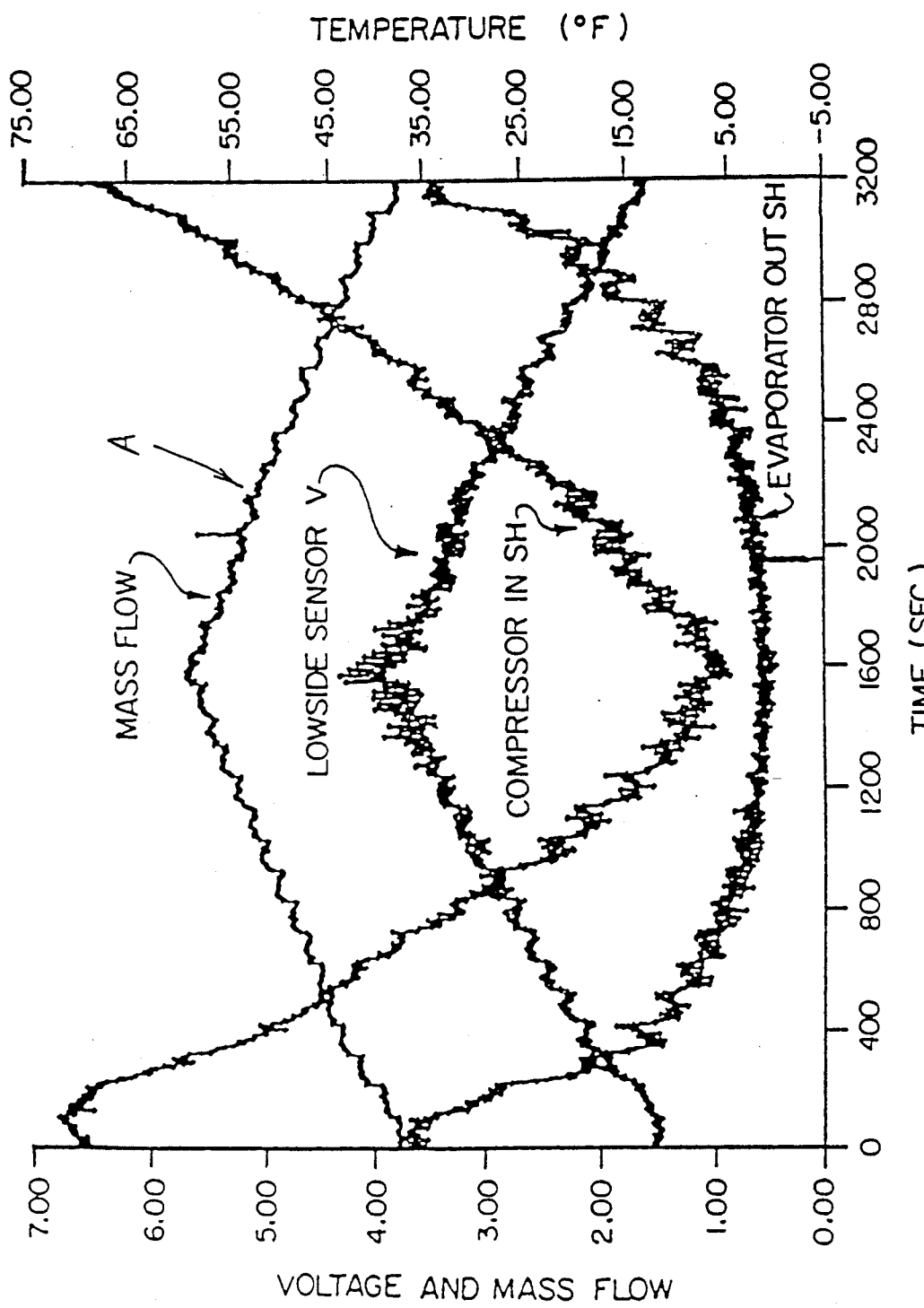
FIG. 4 is a series of graphs representing various signals and operating conditions that exemplify the principles and operation of the invention.

Operation of the control circuit 160 will be best understood in view of FIG. 2 as well as FIG. 4. The microprocessor 70 is programmed in a conventional well-known manner to produce a preferably binary output control signal on signal line 84. The control signal has two discreet states, high and low. During each time period when the control signal is high, the switching transistor 80 is turned on and the amplifier 88 output is about zero volts. The amplifier 92 and current source transistor 94 circuit is appropriately biased so that during the control signal high time period a very low level control current is sourced through the thermistor 150. This low current time period can thus be used to sense the temperature of the working fluid because the thermistor 150 will not appreciably self-heat.

During each time period when the control signal is logic low, the switching transistor 80 is turned off and the output of the amplifier 88 is about the supply voltage +V. The amplifier 88 output voltage is conditioned by the amplifier 92 which produces a predeterminable current through the thermistor 150. This control current is sufficient to cause the thermistor to self-heat which in turn causes localized heating of the working fluid. In a typical system, the low level ambient sensing current may be on the order of 5 milliamps and the self-heating current may be, for example, 80 milliamps. The time periods for the self-heat and non-self-heat modes may be selected to be of any convenient duration. Two seconds for the ambient temperature sensing period has been found suitable, while a time period of two and one-half seconds for the self-heat current time has been found suitable. These time periods are not critical, however, and the microprocessor 70 can be programmed to vary these times as desired.

During the time periods when the thermistor 150 is not self-heated, the thermistor is approximately in thermal equilibrium with the working fluid. The resistance, therefore, corresponds to the fluid temperature. Because the voltage and current across the thermistor 150 are inputs to the microprocessor 70, the microprocessor can easily compute the resistance of the thermistor. When the thermistor 150 indicates a working fluid temperature below a predetermined value, such as for example 32° F., the microprocessor commands the compressor to turn off, or turns the condenser fan off as programmed. This is done in order to prevent evaporator frosting or icing, which would reduce the thermodynamic efficiency of the system 10, as well as to prevent insufficient lubricant being carried to the compressor.

The microprocessor is also programmed to control operation of the solenoid valve 22 by controlling the current 23 (FIG. 2) level through the solenoid windings in a controlled feedback manner. As explained in the referenced valve patent applications, precise control over the flow of working fluid through the valve is accomplished using a linear feedback current source wherein the analog level of current determines the valve orifice size. This type of valve has significant advantages over conventional pulse-width modulated valves and stepper motor controlled valves as explained in the referenced application. Although this linear proportional solenoid valve is preferred, any electrically controlled expansion means can be used with the instant invention. The microprocessor 70 also receives the input from the high side pressure sensor 60 as described in the referenced application.

In accordance with the present invention, the microprocessor is programmed to monitor the high side pressure sensor 60 and the quality sensor 150 based on predetermined setpoints. Actual setpoint values stored in the microprocessor or associated memory will be determined, of course, according to such factors as the type of refrigerant used, and the operating requirements of such components as the compressor, condenser, evaporator and the expansion valve. Thus, the invention contemplates a preferred way to implement certain control functions in response to the o selected setpoints, rather than being limited to particular setpoint values.

In normal operation of the heat transfer system 10, the evaporator outlet quality is regulated preferably nearly 100% gas by varying the flow rate through the solenoid valve 22. The quality sensor 150 detects quality during the self-heat mode. When the thermistor 150 is heated it reaches a predetermined temperature that is a function of the percent liquid in the working fluid exiting the evaporator. If, for example, no liquid is present then the thermistor temperature will be at least its setpoint temperature caused by the current therethrough. If the vapor is superheated the thermistor will detect the excess temperature and the microprocessor will cause the valve 22 to open more so as to increase the mass flow. If the quality of the vapor is less than 100% gas, the liquid droplets cool the thermistor 150 below its setpoint and the microprocessor will cause the valve to close more thus reducing mass flow.

According to an important aspect of the invention, the accuracy of the quality sensor is substantially improved by positioning the thermistor 150 in a side cavity or recess so that the working fluid does not directly flow over the thermistor. With reference to FIG. 3, the valve 22 body preferably includes the low side through port 42 that connects the evaporator outlet to the suction line 26. A lateral bore 130 is provided that is open to the through port 42. The thermistor 150 is seated in a counterbore 132 in a fluid tight manner with the thermistor leads 152 being accessible for connection to the control circuit 160 as described hereinbefore. The active area 134 of the thermistor 150, as shown, is disposed in the lateral bore 130 so that it is out of the main flow of the working fluid through the port 42. This arrangement prevents liquid droplets from agglomerating unevenly on the thermistor 150 thus improving the sensitivity of the thermistor to percent quality and mass flow when it is used in the self-heated mode.

As stated, the microprocessor monitors the resistance of the thermistor 150 in the self-heated mode to detect the quality of the working fluid exiting the evaporator, and controls mass flow through the valve 22 in order preferably to keep the quality near 100% gas. Frequent cycling of the compressor clutch for the purpose of controlling high side pressure is avoided in several ways. First, the temperature setpoint for engaging the compressor (based on the quality sensor temperature reading in the non-self-heated mode) is higher than the setpoint temperature for disengaging or deactivating the compressor. The compressor can be electronically engaged and disengaged by means of a clutch mechanism (not shown) as is well known.

Second, the microprocessor is programmed to prevent frequent compressor cycling involves the high side pressure sensor 50 and the quality sensor. If the high side pressure exceeds a first setpoint, the microprocessor turns on the condenser fan, which tends to reduce the high side pressure. If the pressure does not return to normal with the fan on but exceeds a second setpoint valve, the microprocessor cycles the compressor off for a minimum time period.

Third, and according to an important aspect of the invention, however, if the detected high side pressure exceeds a setpoint value that is higher than the condenser fan turn-on value but lower than the compressor disengage value, the microprocessor follows a "flow reduction" mode. The flow reduction mode is preferably effected by an active adjustment of the quality setpoint. The quality setpoint is increased which corresponds to a system demand for higher quality of the evaporator outlet working fluid. This causes, of course, a reduction in the mass flow of working fluid through the valve and evaporator. This results in a reduced inlet pressure to the expansion valve without compressor disengagement. Although the changed quality setpoint reduces the thermodynamic efficiency of the system somewhat (due to increased superheat), this is preferable to disengaging the compressor because when the compressor is disengaged there is no active cooling at all.

According to another aspect of the invention, engaging the compressor causes a severe transient in which mass flow and pressure build-up vary rapidly and can result in large system oscillations as the system regains control. To smooth out this transient, when the clutch is engaged the microprocessor 70 is programmed to source a constant current to the proportional solenoid valve, which causes the valve to open partially. The value of the drive current is set to the same value as existed the last time the compressor was disengaged. After a predetermined time elapses the system returns to normal closed loop regulation of the evaporator outlet quality as described hereinabove. The microprocessor can also be programmed to execute a rapid pull down or cool down mode during which the compressor runs for a predetermined time period after startup when the quality sensor detects refrigerant temperature greater than a preset threshold.

The referenced patent application for the high side pressure sensor filed contempaneously herewith explains how to use such a sensor to detect loss of charge to a "no charge" condition. According to an important aspect of the present invention, the quality sensor can be used to detect a "low charge" condition. This event is detected when the quality setpoint cannot be achieved for a predetermined time period with the expansion valve fully open.

With reference now to FIG. 4, we show several representative graphs that illustrate the effectiveness of the quality sensor versus superheat control mechanisms. To obtain this representative data we controlled and detected the mass flow of the working fluid through the valve 22 as depicted by graph A. The quality sensor output (i.e. the thermistor 150 resistance in effect) closely tracked the mass flow change whereas the conventionally measured superheat did not. We also independently monitored the evaporator superheat, wherein it is noted that mass flow can change substantially in low superheat, operating regions.

While the control circuit 160 has been described with respect to a specific embodiment thereof, the functions of the circuit can be realized in many different embodiments. For example, typical component valves have been provided in FIG. 2, but these are merely exemplary. The graphs of FIG. 4 also are intended to represent typical relationships that could be found in a representative system. Thus, the invention provides apparatus and methods for detecting characteristics of a working fluid in a heat transfer system that is controlled electronically and can accurately detect such characteristics without the need for mechanical or electromechanical pressure sensors, transducers, or the need to measure boiling temperature.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. In combination with a heat transfer system of the type having a fluid circuit comprising a compressor for pressurizing a working fluid received from an evaporator, a condenser and condenser fan for cooling working fluid received from the compressor, and an electrically controlled expansion valve for controlling flow of the working fluid between the condenser and the evaporator: a quality sensor operative in response to a control signal and disposed in the fluid circuit on the outlet side of the evaporator, a high pressure sensor disposed in the fluid circuit on the high pressure side of the expansion valve, and control means for providing said control signal to said quality sensor; said quality sensor detecting quality of the working fluid in the heat transfer system; said control means producing output signals for activating and deactivating the compressor and condenser fan and regulating flow of the working fluid through the expansion valve in response to said high pressure sensor output and said quality sensor output as a function of control setpoints; said control means operating said valve in a flow reduction mode to reduce high side pressure before deactivating the compressor.

2. The system of claim 1 wherein said flow reduction mode is effected by said control means adjusting said quality sensor setpoint when said high pressure sensor output reaches a predetermined value.

3. The system of claim 2 wherein said control means activates the condenser fan when said high pressure sensor output reaches a first predetermined value, deactivates the compressor when said high pressure sensor reaches a second predetermined value greater than said first predetermined value, and effects said flow reduction mode when said high pressure sensor reaches a third predetermined value between said first and second predetermined values.

4. The system of claim 3 wherein said control system adjusts said quality sensor setpoint to effect said flow reduction mode by increasing the quality sensor setpoints resulting in said valve flow being reduced proportionately.

5. The system of claim 4 wherein said expansion valve is a linear proportional solenoid valve.

6. The system of claim 5 wherein said control means detects a low charge condition of the working fluid by determining the time period during which a predetermined quality setpoint cannot be met when the expansion valve is fully open.

7. The system of claim 6 wherein said control means operates the expansion valve in a rapid pulldown mode when said quality sensor detects an ambient evaporator outlet temperature of the working fluid greater than a fourth predetermined value after system start-up.

8. The system of claim 7 wherein said quality sensor detects working fluid temperature in a low power mode determined by said control signal.

9. The system of claim 8 wherein said quality sensor detects quality of the working fluid in a self-heated mode determined by said control signal.

10. The system of claim 9 wherein said quality sensor comprises a thermistor.

11. The system of claim 10 wherein said thermistor is disposed in the working fluid in a region out of direct flow of the working fluid.

12. The system of claim 11 wherein said high pressure sensor comprises a self-heated thermistor, said control means detecting a minimum thermal resistance between said thermistor and the working fluid.

13. A method for controlling operation of an expansion valve and compressor in a heat transfer system comprising the steps of:
   a) detecting high side pressure of the working fluid;
   b) detecting quality of the working fluid between the evaporator and compressor;
   c) controlling operation of the expansion valve as a function of the detected working fluid quality based on a predetermined setpoint; and
   d) adjusting said quality setpoint as a function of said high side pressure.

14. The method of claim 13 wherein the compressor is deactivated when said high side pressure reaches a first predetermined value, the condenser fan is activated at a high side pressure second predetermined value that is less than said first predetermined value, and the expansion value is partially closed when the high side pressure reaches a value between said first and second predetermined values.

* * * * *